US012130426B2

(12) United States Patent
Goldman et al.

(10) Patent No.: US 12,130,426 B2
(45) Date of Patent: Oct. 29, 2024

(54) DISTALLY ACTUATED SCANNING MIRROR

(71) Applicant: Red Creamery, LLC, Massapequa, NY (US)

(72) Inventors: Ron Goldman, Cold Spring Harbor, NY (US); Dmitry Yavid, Stony Brook, NY (US); Igor Paprotny, Chicago, IL (US); Christopher Silvio Cosentino, JerseyCity, NJ (US)

(73) Assignee: RED Creamery LLC, Massapequa (MY)

( * ) Notice: Subject to any disclaimer, the term of this patent is extended or adjusted under 35 U.S.C. 154(b) by 0 days.

(21) Appl. No.: 18/536,355

(22) Filed: Dec. 12, 2023

(65) Prior Publication Data

US 2024/0184098 A1 Jun. 6, 2024

Related U.S. Application Data

(63) Continuation of application No. 17/964,139, filed on Oct. 12, 2022, now Pat. No. 11,933,967, which is a continuation of application No. 17/000,464, filed on Aug. 24, 2020, now Pat. No. 11,556,000.

(60) Provisional application No. 62/890,189, filed on Aug. 22, 2019.

(51) Int. Cl.
*G02B 26/08* (2006.01)
(52) U.S. Cl.
CPC .................. *G02B 26/0858* (2013.01)
(58) Field of Classification Search
None
See application file for complete search history.

(56) References Cited

U.S. PATENT DOCUMENTS

| 4,941,719 A | 7/1990 | Hisada |
| 5,159,225 A | 10/1992 | Um |
| 5,570,224 A | 10/1996 | Endo |

(Continued)

FOREIGN PATENT DOCUMENTS

| CN | 104299244 B | 7/2017 |
| CN | 109997057 B | 7/2020 |

(Continued)

*Primary Examiner* — Jennifer D. Carruth
(74) *Attorney, Agent, or Firm* — Thomas A. O'Rourke; James Bongiorno; O'Rourke IP Law PLLC

(57) ABSTRACT

A distally-actuated scanning mirror includes: a mirror block with reflective surface on one side; torsional hinges with proximal ends rigidly attached to the mirror block, and with distal ends attached to flexural structures configured to transform translational motion of the piezoelectric elements into rotational motion of the distal ends of the hinges; and piezoelectric elements providing such translational motion. The distally-actuated scanning mirror also includes flexural structures made of separate flexures attached to the opposite surfaces of the distal ends of the hinges, which flexural structures have defined thinned-down flexural points. Portions of the distally-actuated scanning mirror may be 3D printed and/or fabricated by silicon MEMS technology. The mirror is fabricated from a Silicon-on-Insulator wafer, having a relatively thick (e.g., 380 um) handle layer, and a relatively thin e.g., 50 um), where photolithography with backside-alignment allows separate patterning of these two layers.

3 Claims, 11 Drawing Sheets

(56) References Cited

U.S. PATENT DOCUMENTS

| | | |
|---|---|---|
| 5,670,935 A | 9/1997 | Schofield |
| 5,831,719 A | 11/1998 | Berg |
| 5,870,180 A | 2/1999 | Wangler |
| 6,323,941 B1 | 11/2001 | Evans |
| 6,396,397 B1 | 5/2002 | Bos |
| 6,448,572 B1 | 9/2002 | Tennant |
| 6,608,669 B2 | 8/2003 | Holton |
| 6,882,409 B1 | 4/2005 | Evans |
| 7,190,854 B1 | 3/2007 | Novotny |
| 7,195,163 B2 | 3/2007 | Yoo |
| 7,375,804 B2 | 5/2008 | Liebman |
| 7,440,084 B2 | 10/2008 | Kane |
| 7,701,558 B2 | 4/2010 | Walsh |
| 7,720,580 B2 | 5/2010 | Higgins-Luthman |
| 7,746,450 B2 | 6/2010 | Willner |
| 7,800,736 B2 | 9/2010 | Pack |
| 7,821,619 B2 | 10/2010 | Krikorian |
| 7,830,442 B2 | 11/2010 | Griffis |
| 7,894,044 B1 | 2/2011 | Sullivan |
| 8,072,663 B2 | 12/2011 | O'Neill |
| 8,081,301 B2 | 12/2011 | Stann |
| 8,090,153 B2 | 1/2012 | Schofield |
| 8,098,889 B2 | 1/2012 | Zhu |
| 8,120,754 B2 | 2/2012 | Kaehler |
| 8,125,622 B2 | 2/2012 | Gammenthaler |
| 8,229,663 B2 | 7/2012 | Zeng |
| 8,332,134 B2 | 12/2012 | Zhang |
| 8,362,889 B2 | 1/2013 | Komori |
| 8,446,571 B2 | 5/2013 | Fiess |
| 8,599,367 B2 | 12/2013 | Canham |
| 8,648,702 B2 | 2/2014 | Pala |
| 8,767,190 B2 | 7/2014 | Hall |
| 8,798,841 B1 | 8/2014 | Nickolaou |
| 8,829,417 B2 | 9/2014 | Krill |
| 8,855,849 B1 | 10/2014 | Ferguson |
| 8,976,340 B2 | 3/2015 | Gilliland |
| 9,041,915 B2 | 5/2015 | Earhart |
| 9,056,395 B1 | 6/2015 | Ferguson |
| 9,069,061 B1 | 6/2015 | Harwit |
| 9,098,753 B1 | 8/2015 | Zhu |
| 9,110,163 B2 | 8/2015 | Rogan |
| 9,111,444 B2 | 8/2015 | Kaganovich |
| 9,128,185 B2 | 9/2015 | Zeng |
| 9,255,989 B2 | 2/2016 | Joshi |
| 9,300,321 B2 | 3/2016 | Zalik |
| 9,315,192 B1 | 4/2016 | Zhu |
| 9,366,938 B1 | 6/2016 | Anderson |
| 9,369,689 B1 | 6/2016 | Tran |
| 9,383,753 B1 | 7/2016 | Tempelton |
| 9,470,520 B2 | 10/2016 | Schwarz |
| 9,525,863 B2 | 12/2016 | Nawasra |
| 9,575,184 B2 | 2/2017 | Gilliand |
| 9,831,630 B2 | 11/2017 | Lipson |
| 9,881,220 B2 | 1/2018 | Korvadi |
| 9,885,778 B2 | 2/2018 | Dussan |
| 9,892,567 B2 | 2/2018 | Binion |
| 10,031,231 B2 | 7/2018 | Zermas |
| 10,032,369 B2 | 7/2018 | Korvadi |
| 10,115,024 B2 | 10/2018 | Stein |
| 10,126,412 B2 | 11/2018 | Eldada |
| 10,295,670 B2 | 5/2019 | Stettner |
| 10,331,956 B2 | 6/2019 | Solar |
| 10,445,928 B2 | 10/2019 | Nehmadi |
| 10,523,880 B2 | 12/2019 | Gassend |
| 10,641,872 B2 | 5/2020 | Dussan |
| 10,809,380 B2 | 10/2020 | Pacala |
| 11,300,778 B2 * | 4/2022 | Albert ............... G02B 26/0833 |
| 11,556,000 B1 | 1/2023 | Goldman |
| 2002/0140924 A1 | 10/2002 | Wangler |
| 2005/0173770 A1 | 8/2005 | Linden et al. |
| 2007/0035624 A1 | 2/2007 | Lubard |
| 2010/0053715 A1 | 3/2010 | O'Neill |
| 2010/0204974 A1 | 8/2010 | Israelsen |
| 2012/0170029 A1 | 7/2012 | Azzazy |
| 2012/0236379 A1 | 9/2012 | da Silva |
| 2013/0242283 A1 | 9/2013 | Bailey |
| 2015/0301180 A1 | 10/2015 | Stettner |
| 2015/0032911 A1 | 11/2015 | Prokhorov |
| 2016/0162743 A1 | 6/2016 | Chundrlik |
| 2020/0101890 A1 | 4/2020 | Solar |

FOREIGN PATENT DOCUMENTS

| | | |
|---|---|---|
| DE | 102007044536 A1 | 3/2009 |
| EP | 2122599 B1 | 11/2019 |
| EP | 3671261 A1 | 6/2020 |
| JP | 2009086787 A | 4/2009 |
| JP | 2017162204 A | 9/2017 |
| JP | 2020521955 A | 7/2020 |
| WO | WO2008008970 A2 | 1/2008 |
| WO | WO2010141631 A1 | 12/2010 |

* cited by examiner

FIGURE 1 - PRIOR ART

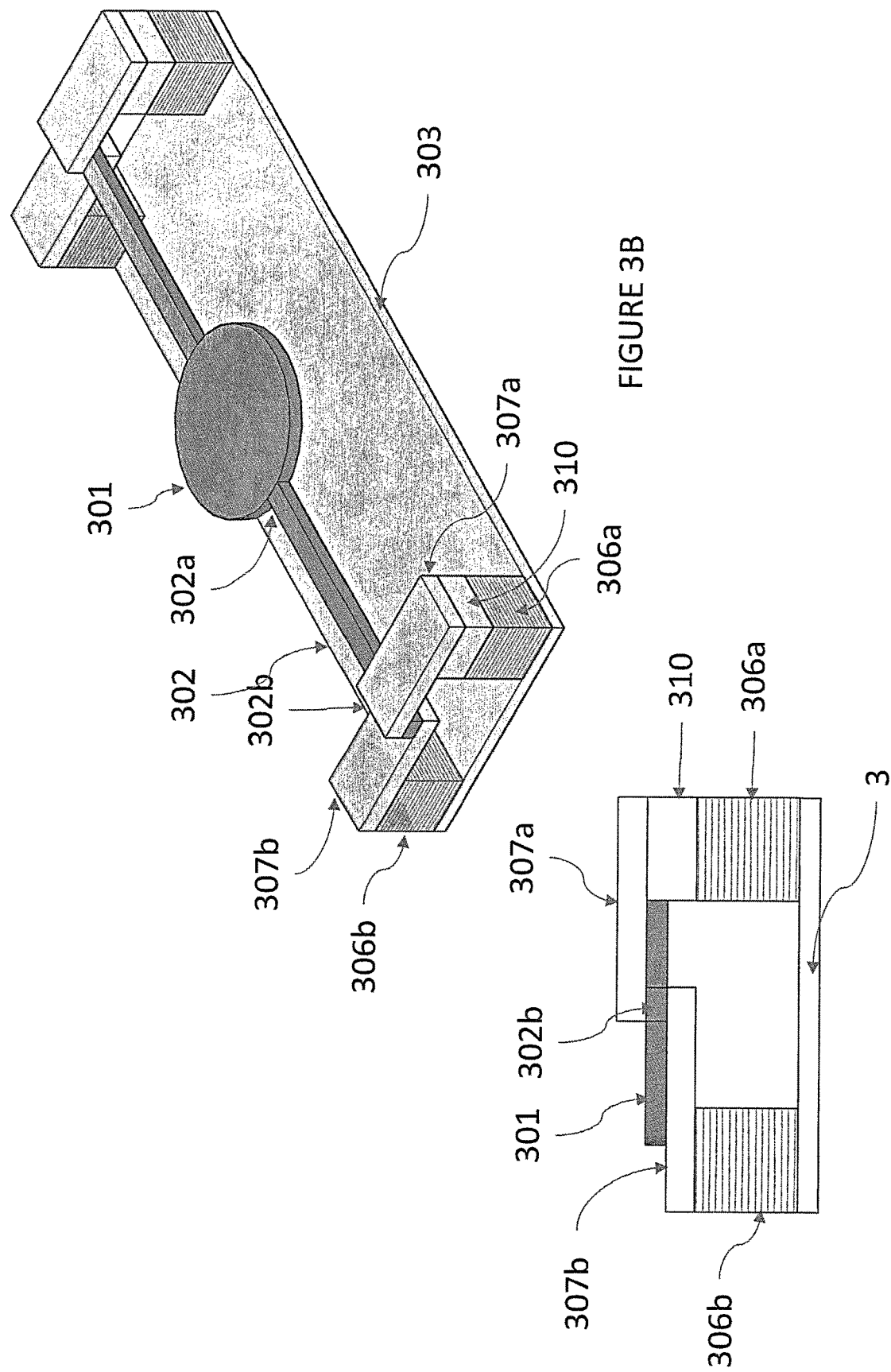

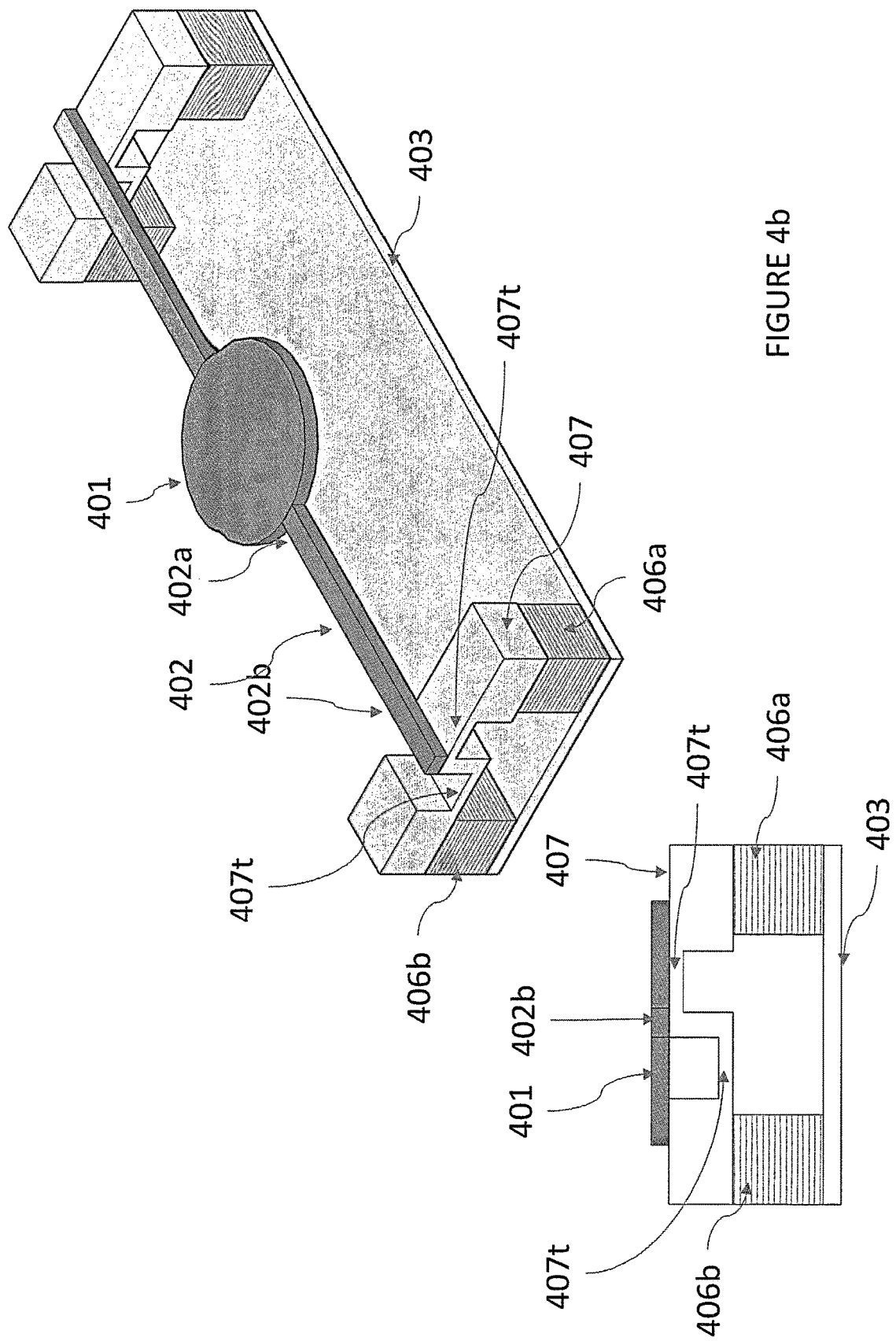

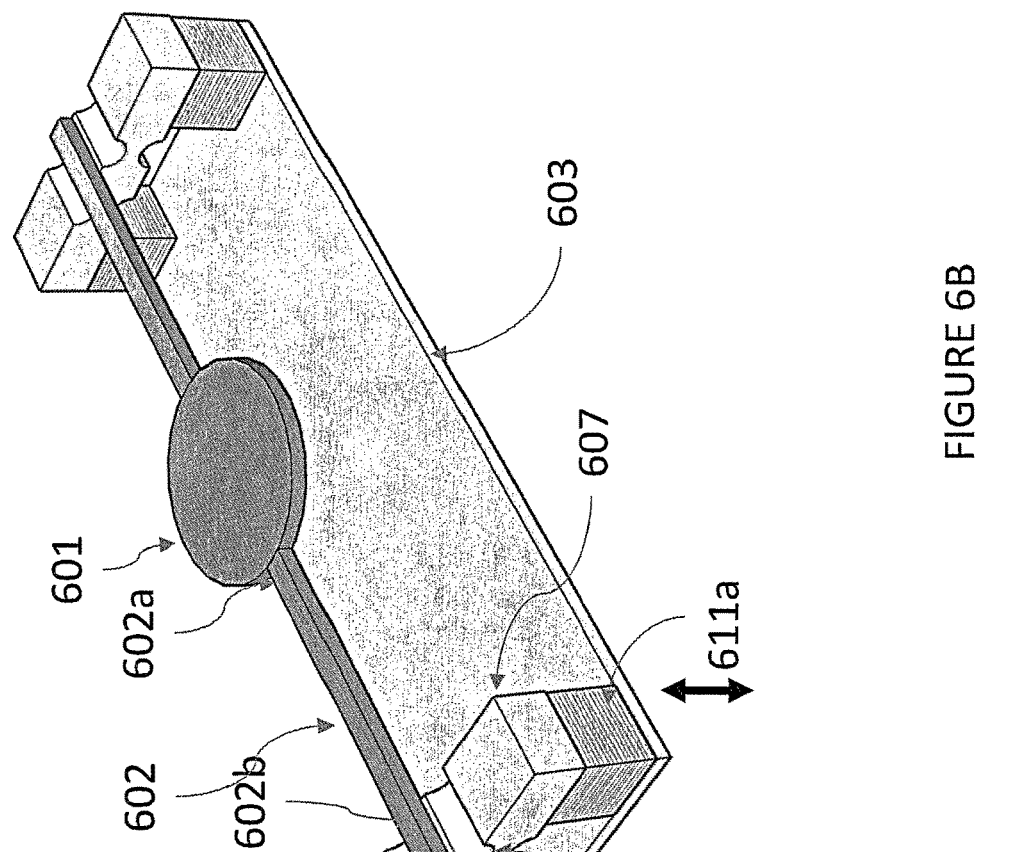
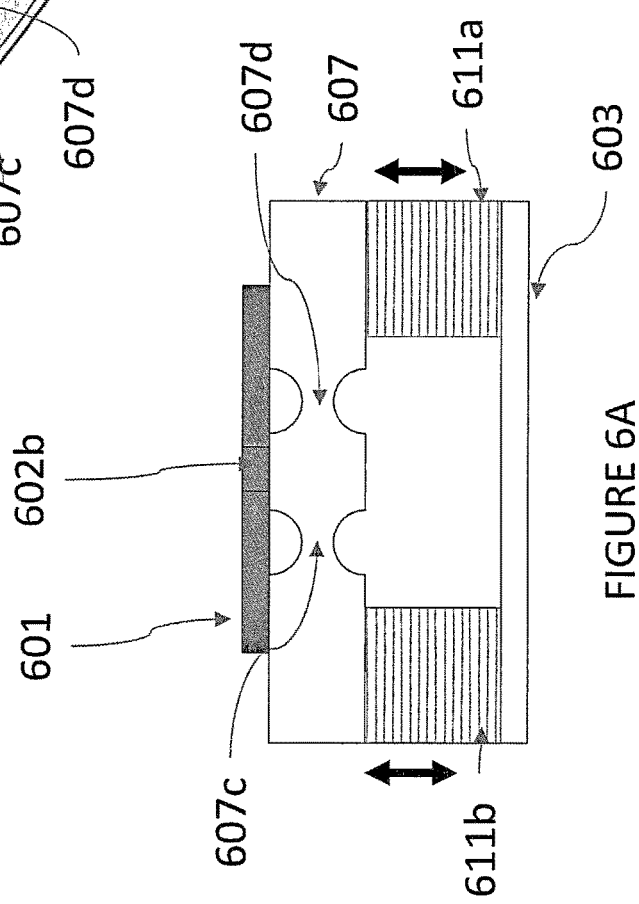
FIGURE 6B
FIGURE 6A

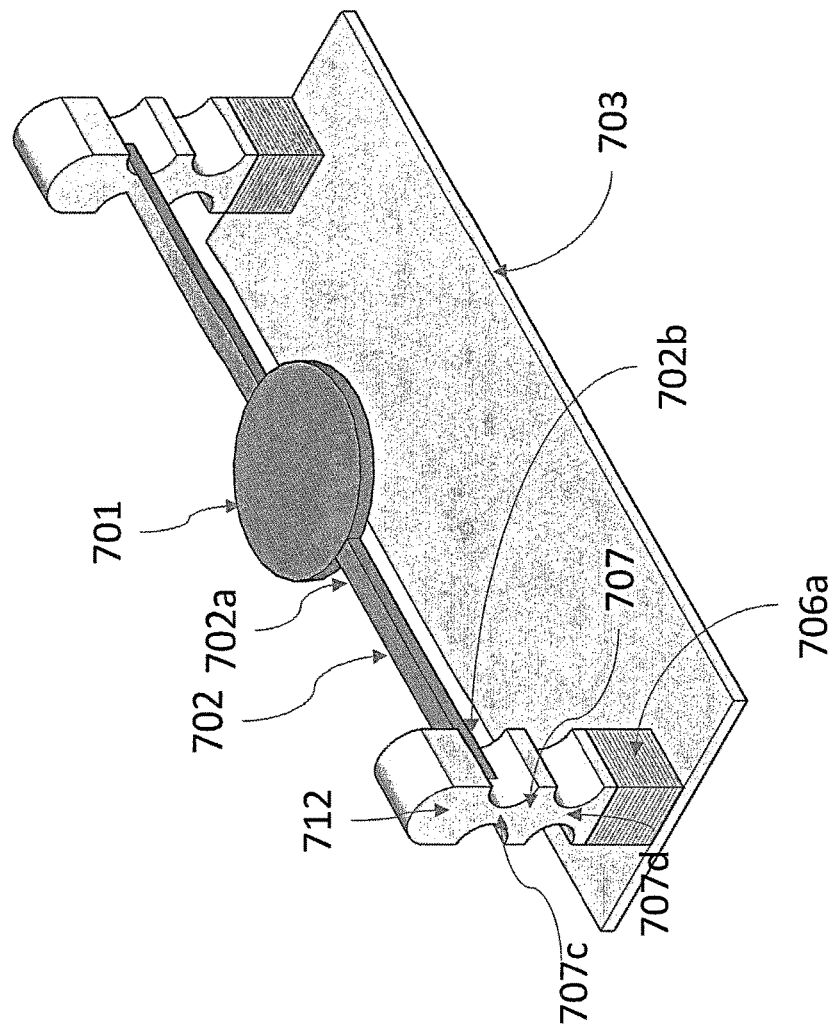
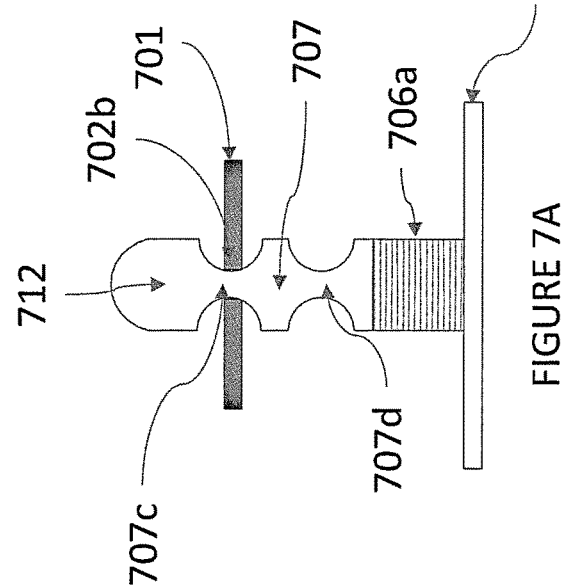
FIGURE 7B
FIGURE 7A

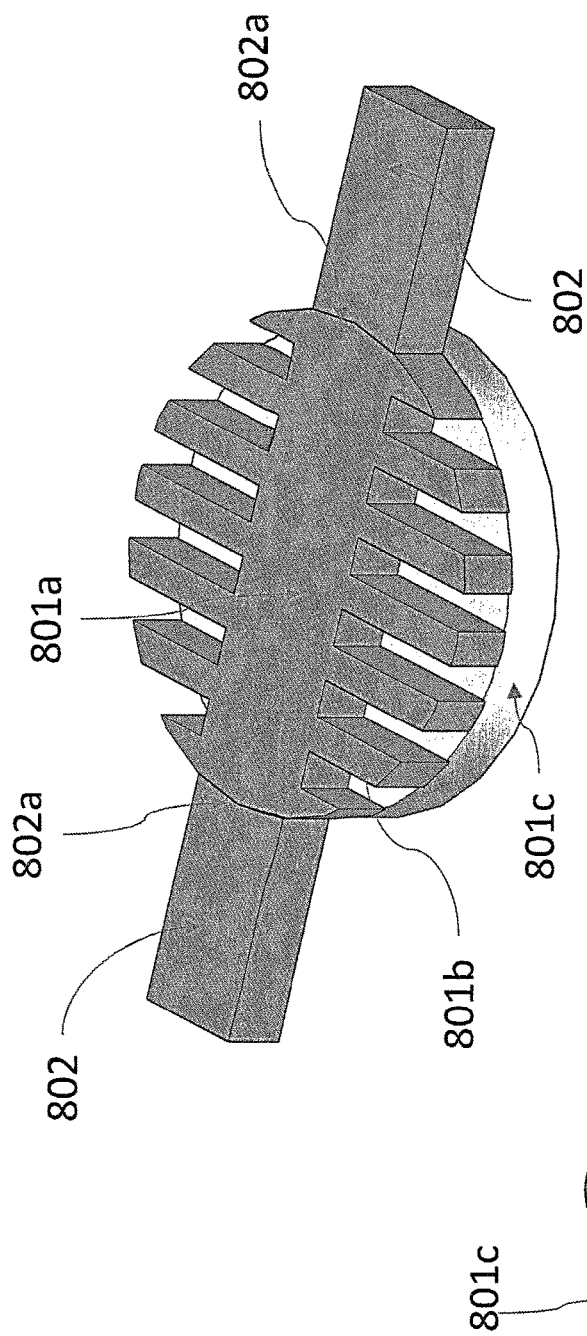
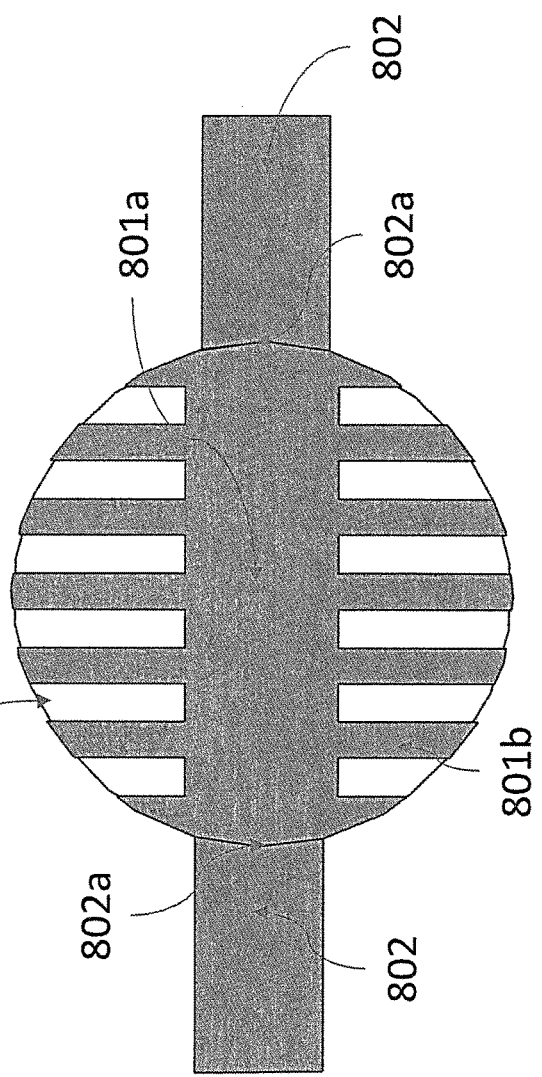
FIGURE 8B
FIGURE 8A

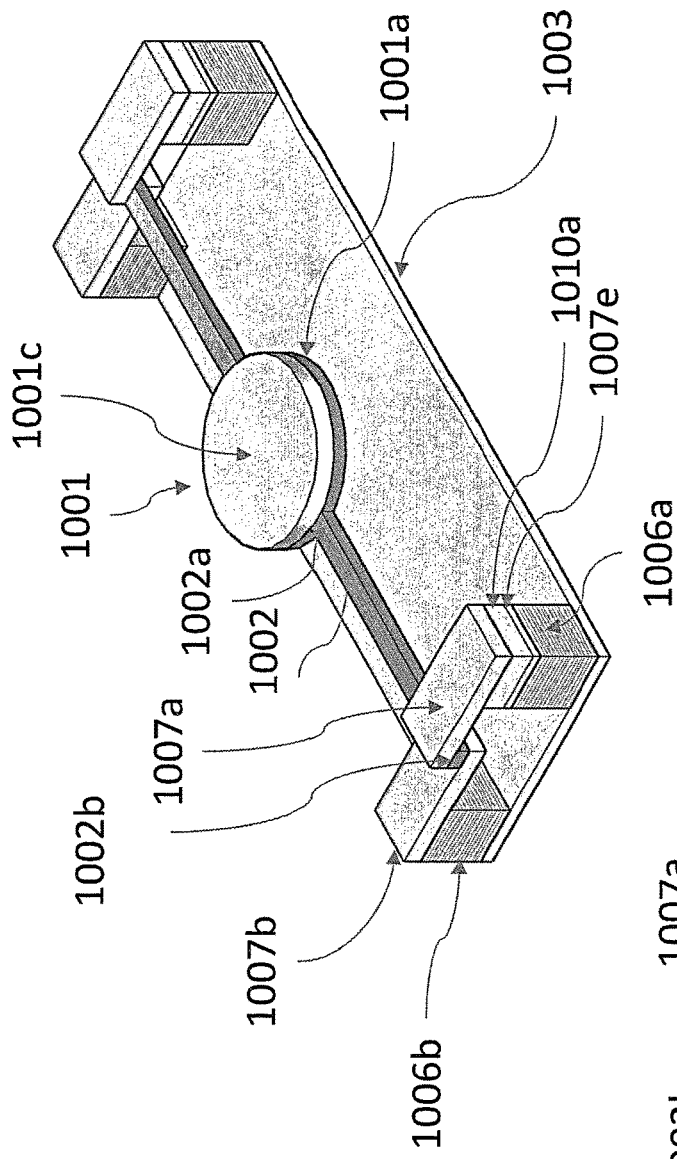
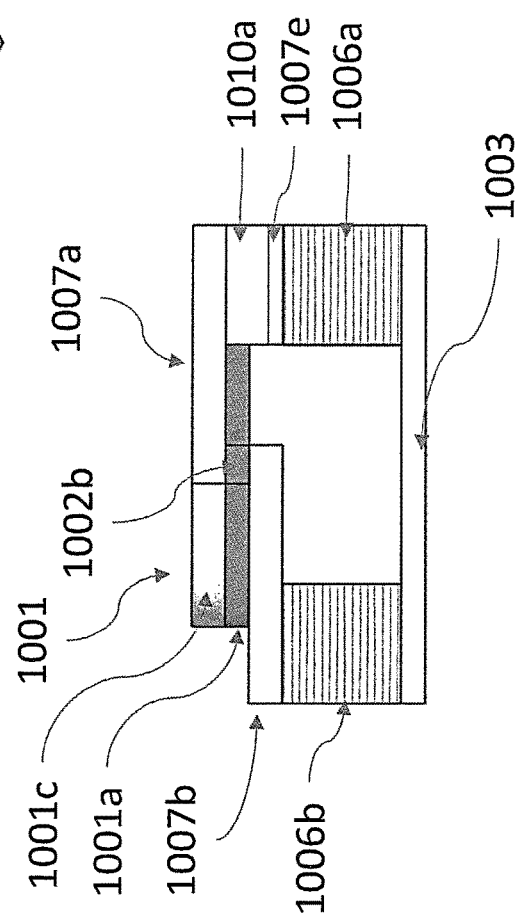
FIGURE 10B
FIGURE 10A

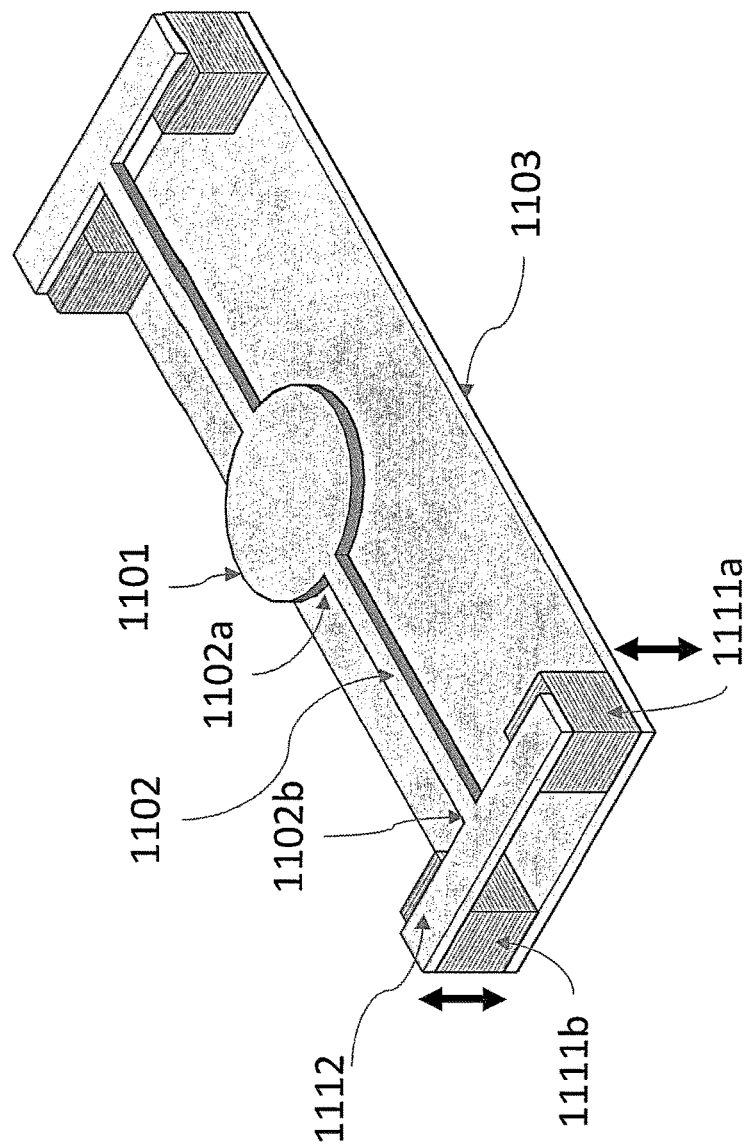
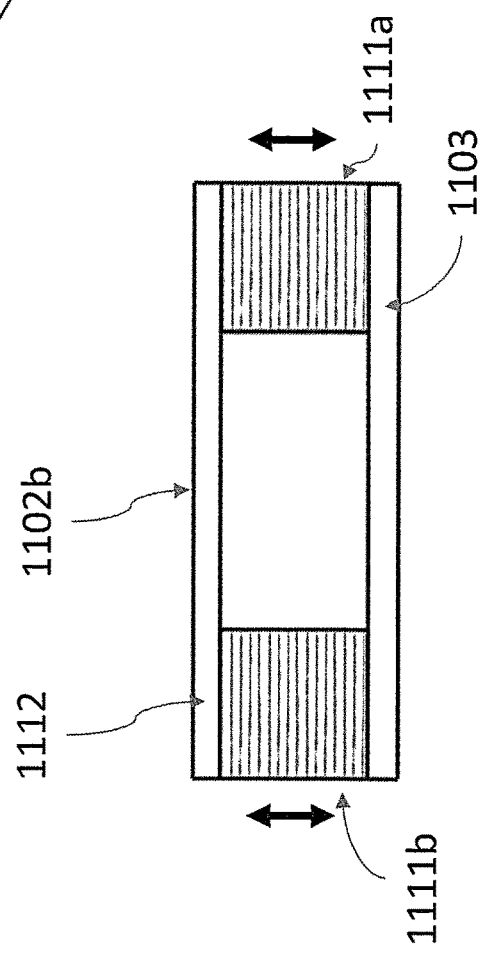
FIGURE 11A
FIGURE 11B

DISTALLY ACTUATED SCANNING MIRROR

CROSS REFERENCES TO RELATED APPLICATIONS

This application is a continuation of U.S. patent application Ser. No. 17/964,139, filed on Oct. 12, 2022, which is a continuation of U.S. patent application Ser. No. 17/000,464, filed on Aug. 24, 2020, which claims priority on U.S. Provisional Application Ser. No. 62/890,189, filed on Aug. 22, 2019, the disclosures of which are incorporated herein by reference.

FIELD OF THE INVENTION

The present invention relates generally to the field of laser beam scanning, and more specifically, to resonant, high-frequency, wide-angle scanning, suitable for a fast stage of 2D raster scanners.

BACKGROUND OF THE INVENTION

The advent of lasers producing thin, highly-collimated beams of light demanded development of special means to direct those beams in desired direction, an angularly-movable mirror being the simplest of such means. Reflecting a beam from two mirrors with orthogonal directions of rotation enables the creation of a 2D pattern of laser light on the target surface. While most applications are satisfied with vector patterns, and, respectively, relatively slow mirrors, some applications, such as laser projectors and LIDARs, require raster scanning, and very fast mirrors for at least one of the two directions.

Almost without exception, fast scanning mirror are resonant, consisting of the mirror itself suspended on some form of torsional hinge, and capable of torsional oscillations with the frequency defined by the mirror inertia and the spring rate of the hinge. Frequencies in excess of 20 kHz, and total optical scan angles of the order of 1 radian have been achieved by mirrors of ~1 mm in diameter. Silicon MEMS (Micro-Electro-Mechanical System) technology has become dominant in fabrication of the fast scanning mirrors.

A typical MEMS scanning mirror, as shown on FIG. 1, consists of the mirror block 101, typically of round or oval or rectangular shape, with the reflective surface on one side, and two torsional hinges 102, with proximal ends 102a rigidly attached to the mirror block, and distal ends 102b rigidly attached to a base. The mirror block 101 carries some elements of the actuator, such as permanent magnets, coils, or electrodes, whereas the other parts of the actuator are mounted to the base. For illustrative purposes, the permanent magnet 104 is shown attached to the mirror block 101, while the coil 105 is stationary. The magnetic interaction between the magnet 104 and the coil 105 creates torque acting on the mirror block 101, and if the frequency of this torque equals the mechanical resonant frequency of the mirror block 101 on the torsion hinges 102, the mirror block 101 would reach large scan angles.

However, actuation to large scan angles requires considerable force and considerable amount of mechanical energy, which grow rapidly with the increase of the mirror block 101 size, frequency and scan angle. Provision of such force and energy necessitate increasing the size of the elements of the actuator, including those attached to the mirror block, such as permanent magnet 104, which in turns increases the mirror block's 101 inertia, and requiring even more actuation energy.

OBJECTS OF THE INVENTION

The present invention is aimed at overcoming the limitations of the existing scanning mirrors and enabling high-resolution, high-frame-rate raster scanning for laser projection and LIDAR applications. More specifically, these aims are:
1. Provision of plentiful mechanical power to the mirror without increasing mirror's inertia, to simultaneously enable large mirror size, high resonant frequency, and wide scan angle
2. Increased actuation efficiency
3. Reduction of the mirror inertia without reducing its usable surface area

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The above-noted objects of this invention may be achieved by:
1. Moving the elements of the actuator from the mirror block to the distal ends of the mirror's torsional hinges
2. Using piezoelectric elements as the means of converting electrical power into mechanical one.
3. Providing a mechanism to convert the motion of the piezoelectric element, that is generally translational, into the rotational motion of the distal end of the mirror's torsional hinge
4. Employing MEMS technology on Silicon-On-Insulator (SOI) wafer to produce mirrors with large reflective surface in the device layer, supported by a lattice with maximum rigidity and minimal inertia in the handle layer.

BRIEF DESCRIPTION OF THE DRAWINGS

FIG. 3A (side view) illustrates generating actuation torque by shear-mode piezoelectric elements.

FIG. 3B (3-dimensional view) illustrates generating actuation torque by shear-mode piezoelectric elements.

FIG. 4A (side view) illustrates a monolithic flexure applying actuation torque to the distal ends of the torsion hinge.

FIG. 4B (3-dimensional view) illustrates a monolithic flexure applying actuation torque to the distal ends of the torsion hinge.

FIG. 6A and FIG. 6B are side and perspective views illustrating a monolithic flexure with defined thinned-down flexural points actuated by expansion-mode piezoelectric elements applying actuation torque to the distal ends of the torsion hinge.

FIG. 7A and FIG. 7B are side and perspective views illustrating a monolithic flexure with defined thinned-down flexural points actuated by a single piezoelectric element and a floating mass in place of the other piezoelectric element.

FIG. 8A and FIG. 8B are side and perspective views illustrating a mirror block fabricated in SOI wafer.

FIG. 10A and FIG. 10B are side and perspective views illustrating a mirror fabricated in double-SOI wafer with flexures fabricated in both device layers.

FIG. 11A and FIG. 11B are side and perspective views of a laser beam scan structure in which a single silicon component forms an I-beam shaped hinge and mirror combination, which is supported and driven by pairs of expansion-mode piezoelectric elements.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, all references (e.g., patents, published patent applications, and non-patent literature) that are cited within this document are incorporated herein in their entirety by reference.

Furthermore, the described features, advantages, and characteristics of any particular embodiment disclosed herein, may be combined in any suitable manner with any of the other embodiments disclosed herein.

The following description lists several embodiments of the present invention, which are merely exemplary of many variations and permutations of the subject matter disclosed.

Mention of one or more representative features of a given embodiment is likewise exemplary: an embodiment can exist with or without a given feature, and likewise, a given feature can be part of other embodiments.

Figure 1:
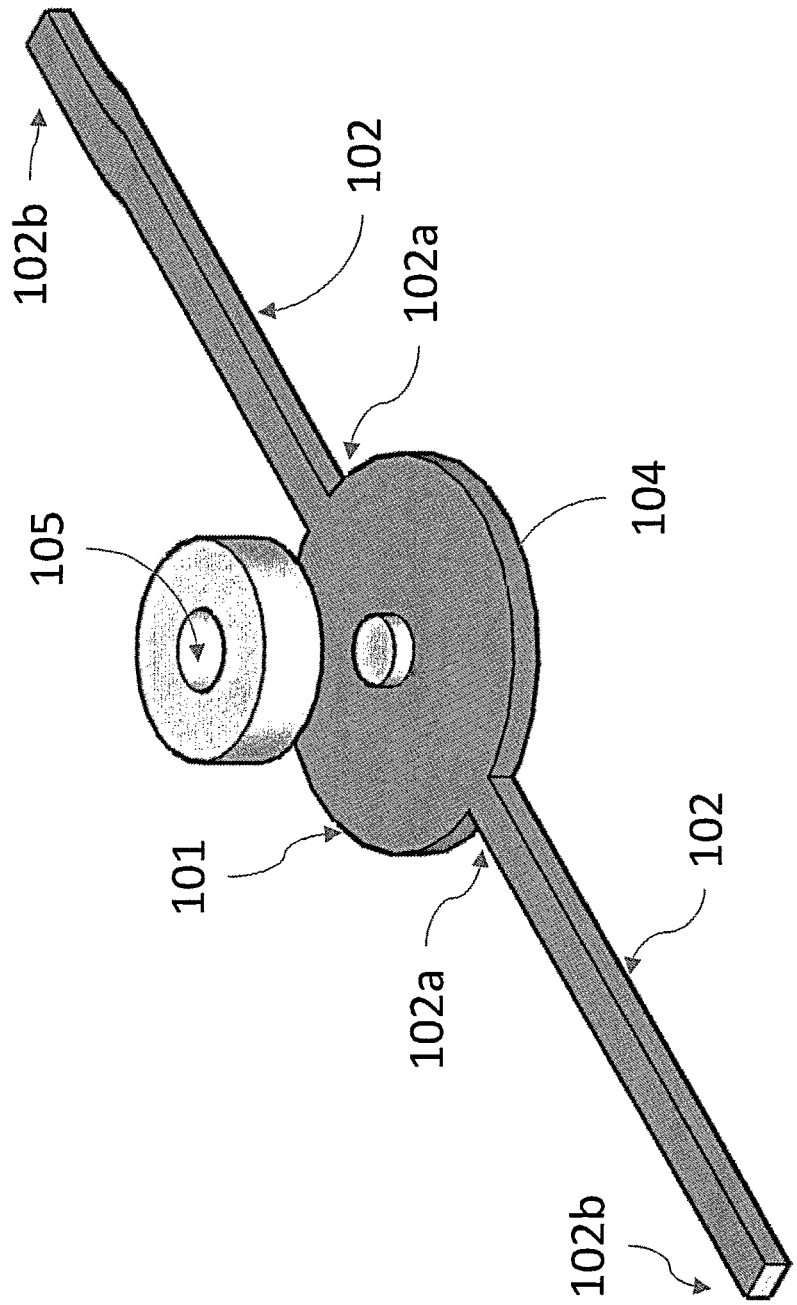
FIG. 1 illustrates prior art of fast scanning mirror.
Figure 2:
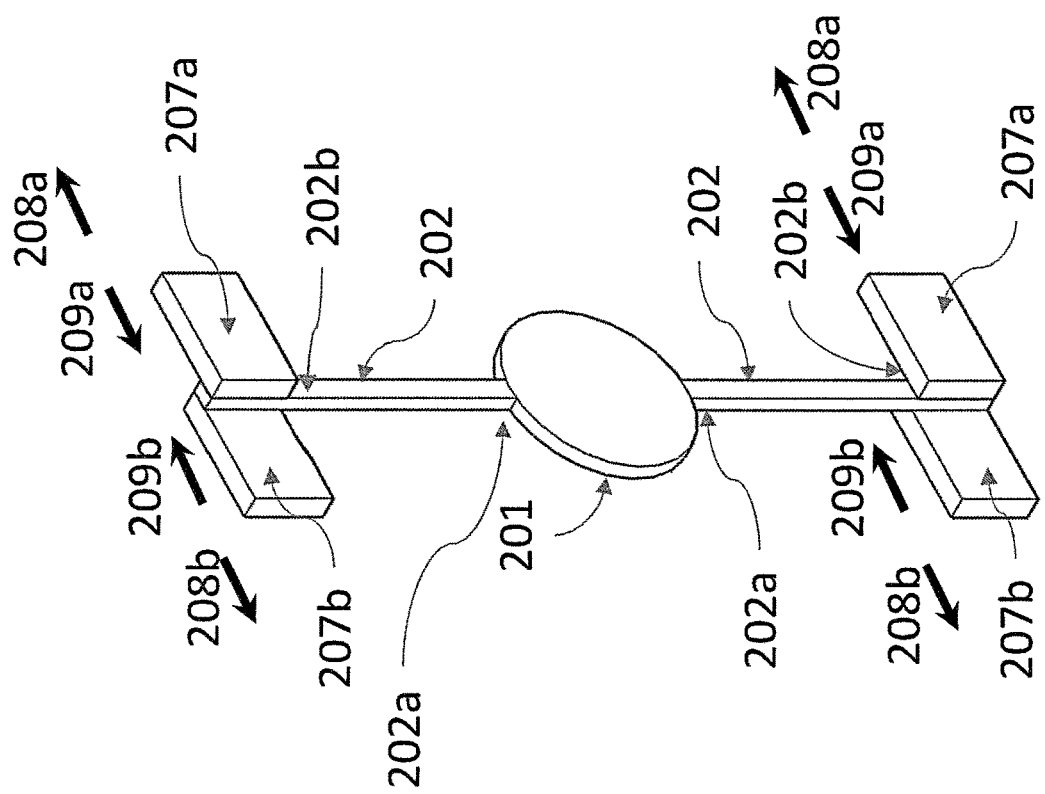
FIG. 2 illustrates applying actuation torque to the distal ends of the torsion hinge through flexures.

In the preferable embodiment illustrated on FIG. 2, the mirror block 201, which is coupled to the proximal end 202a of hinge 202, does not carry any elements of the actuator. Instead, actuation is achieved by applying the torque to the distal ends 202b of the torsion hinges. The frequency of this torque must still be equal or close to the mechanical resonant frequency of the mirror block on the torsion hinges. The actuation torque on one hinge is provided by flexures 207a and 207b attached to the opposite surfaces of the distal end 202b of the hinge. Both flexures move either away from each other, as shown by the arrows 208a and 208b, or toward each other, as shown by the arrows 209a and 209b, thus making the distal end of the hinge to rotate in one or the other direction. The other torsional hinge, if present, is actuated likewise.

FIG. 3A is a side view shown viewed along the axis of the hinge 302, which further illustrates this embodiment by showing a pair of shear-mode piezoelectric elements 306a and 306b, mounted on a stationary base 303 and attached to the flexures 307a and 307b respectively, and energized to cause the flexures to move in the opposite directions as shown on FIG. 2. The mirror block 301 is connected at points 302a to the hinge 302. Alternatively, the mirror 301 and the hinge 302 can be a single integrated piece. A spacer 310, equal in height to the combined thickness of the distal end 302b and the flexure 307b may be employed to maintain the parallelism of the flexures. Alternatively, piezoelectric elements 306a and 306b may be of different height. Yet alternatively, one of the piezoelectric elements may be replaced by a rigid column, which would reduce the rotational motion of the distal end of the hinge 302b by a factor of two, but may save cost.

FIG. 3B is a three dimensional drawing of the embodiment of FIG. 3A.

Figures 5A, 5B:
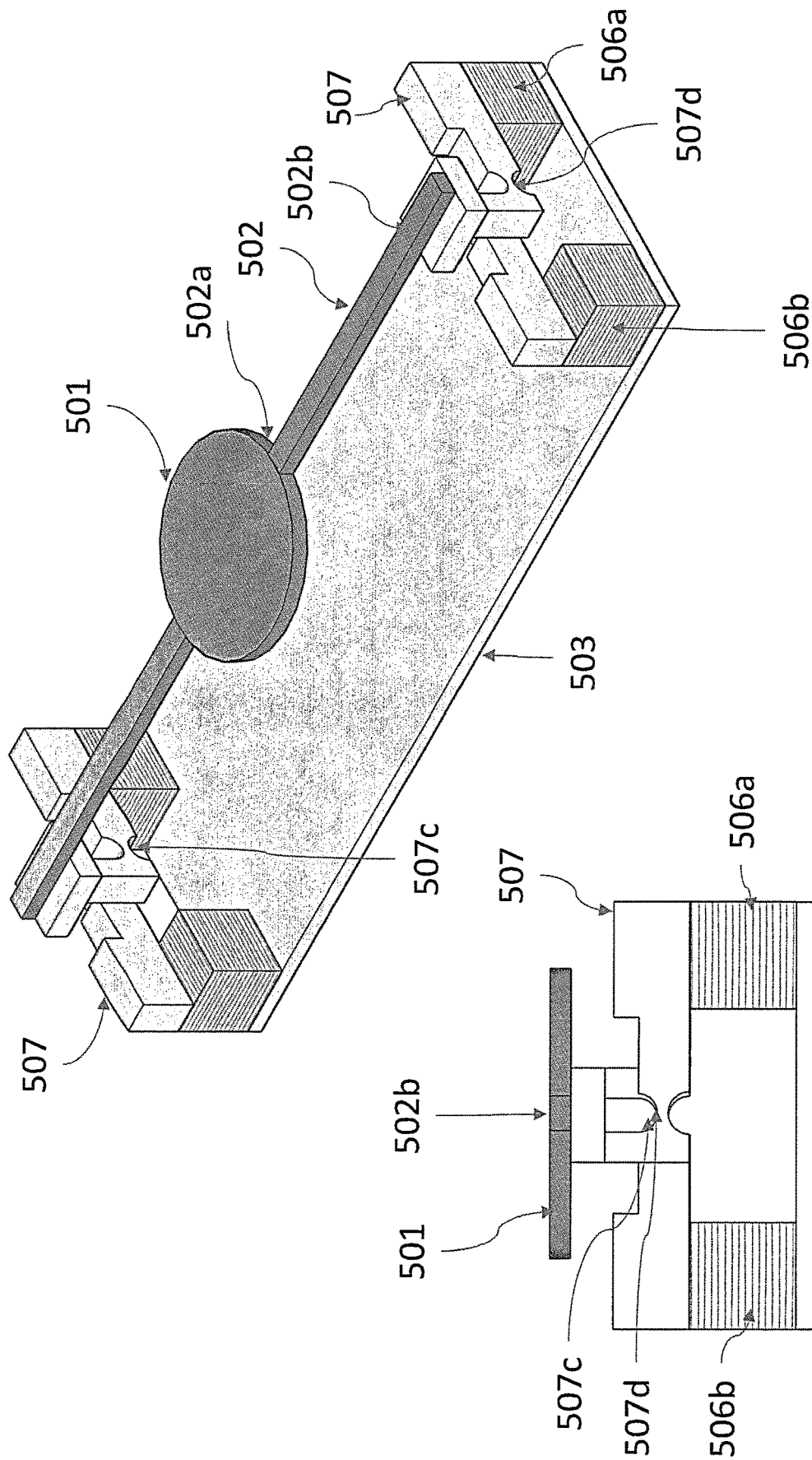
FIG. 5A and FIG. 5B are side and perspective views illustrating a monolithic flexure with defined thinned-down flexural points applying actuation torque to the distal ends of the torsion hinge.

Yet alternatively, flexures 307a and 307b of FIG. 3 may be replaced by a single monolithic flexure 407, attached to both piezoelectric elements 406a and 406b, as shown on FIG. 4A (side view). The monolithic flexure 407 is thinned at locations 407t to function as a hinge. The distal end 402b of the hinge 402 is then attached to the top of the monolithic flexure 407, which is attached to both piezoelectric elements 406a and 406b which extend from base 403, while the proximal end 402a of the hinge is attached to the mirror 401. Such monolithic flexure 407 may be fabricated, for example, by 3D printing. When viewed along the axis of the hinges 402, the monolithic flexure can be, for example, "S" shaped. FIG. 4B is a three dimensional drawing of the embodiment of FIG. 4A FIG. 5 shows an improved embodiment of the monolithic flexure 407 of FIG. 4, having defined thinned-down flexural points 507c and 507d, while the rest of the monolithic flexure 507 is made of thicker material, thus increasing its rigidity and improving its ability to transmit large forces at high frequency from the piezoelectric elements 506a and 506b that may extend from a base 503. The mirror 501 may attach to the proximal end 502a of the hinge 502, while the distal end 502b of the hinge 502 may attach to one side of a platform that rests on a post protruding proximate to a thinned down portion (707c/507d) of the flexure 507.

An embodiment where the shear-mode piezoelectric elements 506a and 506b are replaced with expansion-mode piezoelectric elements 611a and 611b is shown on FIG. 6. The expansion-mode piezoelectric elements are known to provide greater force than shear mode ones. In this embodiment, they move up and down, substantially perpendicular to the top surface of the base 603, in opposite directions, causing the center portion of the flexure 607, together with the attached distal end of the mirror hinge 602b, to rotate thereby causing the hinge 602 and the mirror block 601 that is attached at the proximal ends 602a of the hinge to rotate. The monolithic flexure 607 still has two defined thinned-down flexural points 607c and 607d. Just like with the shear mode piezoelectric elements, one of the expansion-mode piezoelectric elements may be replaced by a rigid column (not shown) to save cost.

FIG. 7 shows an embodiment similar to that shown in FIGS. 6A-6B that eliminates the second piezoelectric element, and adds a floating mass 712 on the opposite side of the attachment of the flexure 707 to the distal end 702b of the hinge 702. The flexure 707 that extends from piezoelectric element 706a may have thinned-down flexural points 707c and 707d. This mass 712 may be an integral part of the flexure 707 as shown, or it can be made separately and attached to it. If the mass 712 is large enough, it would not follow the high-frequency motion of a shear-mode piezoelectric element 706a, but rather stay in place due to its inertia, thus causing the center portion of the flexure 707, together with the attached distal end 702b of the mirror hinge 702 and the mirror block 701, which is attached at the hinge's distal end 702*b*, to rotate. While the angular displacement of the distal end of the mirror hinge 702*b* would be reduced by a factor of two in comparison with various two piezoelectric elements embodiments, it may still benefit from lower cost, simplicity and ease of assembly.

FIG. 8 illustrates an embodiment of the mirror blocks 201, 301, 401 501, 601, 701, 901, 1001, and 1101 aimed at further reducing its inertia without sacrificing rigidity. To achieve this the mirror is fabricated from an Silicon-On-Insulator (SOI) wafer, having a relatively thick, for example 380 um, handle layer, and a relatively thin, for example 50 um, device layer. MEMS fabrication technology, in particular photolithography with backside-alignment, allows separate patterning of these two layers. The reflective surface of the mirror 801*c* is fabricated in the device layer, as a circle, or oval. The mirror block consists of the middle portion 801*a* and multiple fingers 801*b* extending toward the outer edge of the reflective surface, and preventing the thin reflective surface from deforming under substantial inertial forces arising during high-frequency oscillations. Both the middle portion 801*a* and fingers 801*b*, as well as hinges 802, of which the proximal ends 802*a* are shown, are fabricated in the handle layer of the SOI wafer.

Figures 9A, 9B:
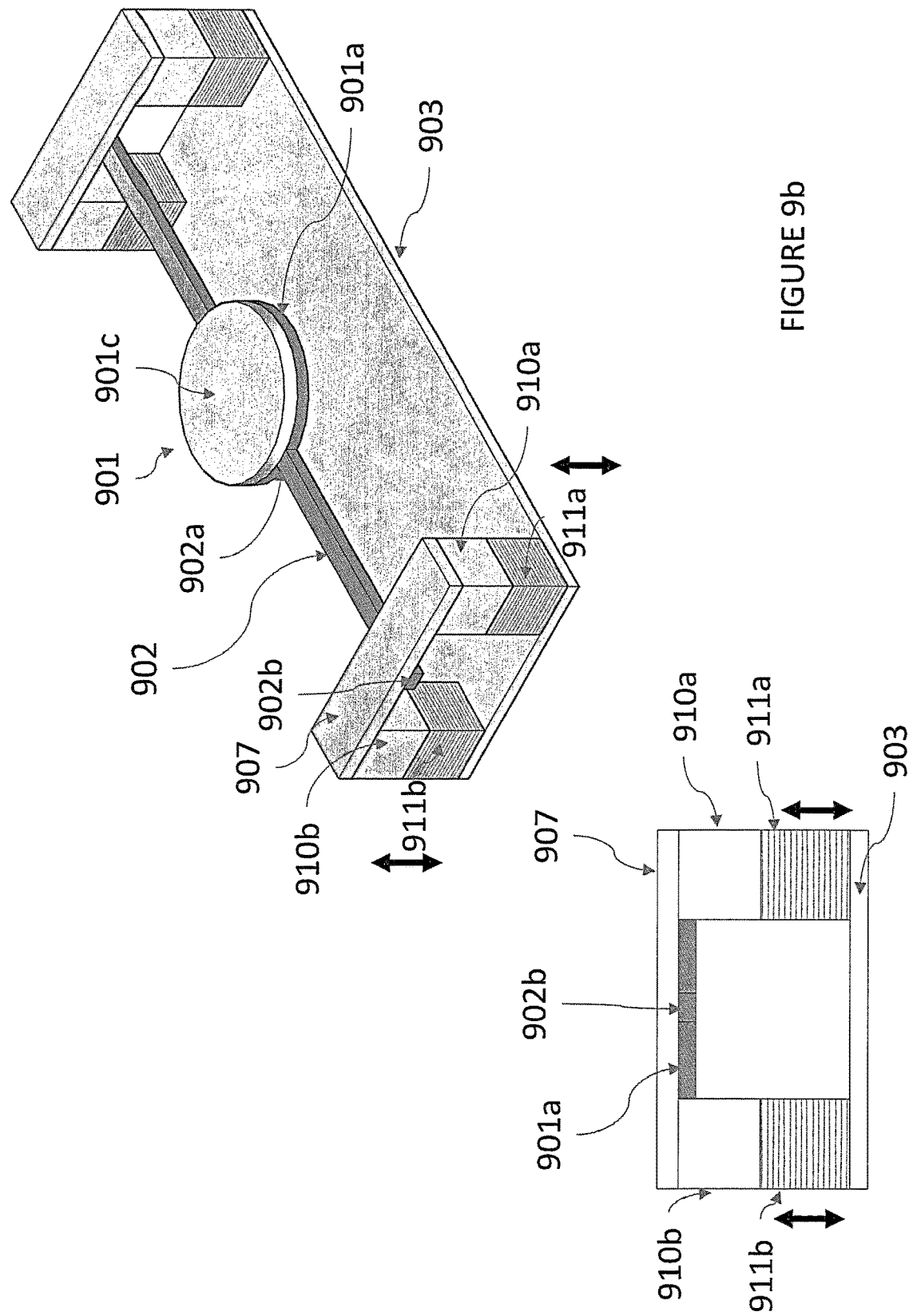
FIG. 9A and FIG. 9B are side and perspective views illustrates an embodiment, with two expansion-mode piezoelectric elements and the flexures fabricated in the device layer of the SOI wafer.

A mirror so fabricated from an SOI wafer can be employed in any of the actuator embodiment discussed above. It should be noted that elements of the actuator, such as one of the flexures or spacers, can be fabricated in the device layer. For example, FIG. 9 illustrates an embodiment that is similar to the embodiment on FIG. 6, with a mirror block 901 which consists of a reflective portion of the mirror 901*c* and a support structure 901*a*. The support structure 901*a* is attached at a proximal end 902*a* of hinge 902, the distal end 902*b* of which joins a flexure 907. The flexure 907 may be separated from two expansion-mode piezoelectric elements 911*a* and 911*b* on each side of the hinge 902 using spacers 910*a* and 910*b*, which piezoelectric elements may extend from a base 903. In this embodiment, the flexure 907 and the reflective portion of the mirror 901*c* are fabricated in the device layer of the same silicon wafer. The hinge 902 and the support structure 901*a* are fabricated in the handle layer of the same silicon wafer.

Furthermore, a double-SOI wafer, having two thin device layers on both sides of a thick handle layer, can be used to fabricate both flexures and mount them directly onto the piezoelectric elements, avoiding the need to fabricate them from a different material using different technology. Such an embodiment is shown on FIG. 10, which uses a mirror block 1001 consisting of a reflective surface 1001*c* and a support structure 1001*a*; a hinge 1002 having proximal and distal ends 1002*a*/1002*b*, which proximal end transitions into flexures 1007*a* and 1007*b* and the distal end transitions into the support structure 1001*a*; and piezoelectric elements 1006*a* and 1006*b* that extend from a base 1003. In this case, the spacer 1010*a*, the hinge 1002 and the support structure 1001*a* would be fabricated in the handle layer, while the reflective surface 1001*c* and flexure 1007*a* would be part of the same first device layer. Flexure 1007*b* and a portion 1007*e* underneath spacer 1010*a* can be part fabricated from the same second device layer A further embodiment is shown in FIG. 11A (side view) and FIG. 11B (3D view). A single silicon component is formed by the mirror 1101, and the hinge portions 1102 and 1112, which altogether may form an I-beam shape. The proximal end 1102*a* of the hinge portion 1102 may transition into the mirror 1101, and the distal end 1102*b* of the hinge portion 1102 may transition into the hinge portion 1112. The hinge portion 1112 may be positioned laterally with respect to the hinge portion 1102, to form a T-shape, where the hinge portion 1112 is the base of the T-shape, and the hinge portion 1112 is the crosswise leg of the T shape, extending in opposing first and second directions away from the hinge portion 1112.

The distal ends of the hinge portion 1112 are attached to the pairs of expansion-mode piezoelectric elements 1111*a* and 1111*b* that extend from the stationary base 1103, and which are driven in a push pull fashion, wherein the elements 1111*a* and 1111*b* are cycled such that elements 1111*a* and 1111*b* are alternately expanded and contracted. This results in rotational energy being applied to the hinge 1102 and the mirror block 1101. Accordingly, the mirror block is rotated about the axis of the hinge 1102. The expansion-mode piezoelectric elements 1111*a* and 1111*b* provide much more force than the single piezo elements utilized in the prior art, and therefore, the mirror 1101 can be driven at a significantly higher frequency and at a wider angle.

We claim:

1. A laser beam scan structure comprising:
    a mirror, wherein said mirror comprises a reflective surface;
    a I-beam shaped hinge, said I-beam shaped hinge comprising:
        a first T-shaped hinge portion, said first T-shaped hinge portion comprising: a base leg configured to extend away from a center portion of said I-beam shaped hinge, and a cross-wise leg having a first portion extending in a first direction away from said base leg, and a second portion extending in a second direction away from said base leg;
        a second T-shaped hinge portion, said second T-shaped hinge portion comprising:
            a base leg configured to extend away from said center portion of said I-beam shaped hinge in a direction opposite of said base leg of said first T-shaped hinge portion and parallel thereto, and a cross-wise leg having a first portion extending in said first direction away from said base leg of said first T-shaped hinge portion, and a second portion extending in said second direction away from said base leg of said first T-shaped hinge portion; and
    a first pair of expansion-mode piezoelectric elements configured to respectively support a distal end of said cross-wise leg of said first T-shaped hinge portion, said first pair of expansion-mode piezoelectric elements being configured to alternately expand and contract to drive said distal end of said cross-wise leg of said first T-shaped hinge portion to oscillate; and
    a second pair of expansion-mode piezoelectric elements configured to respectively support a distal end of said cross-wise leg of said second T-shaped hinge portion, said second pair of expansion-mode piezoelectric elements being configured to alternately expand and contract to drive said distal end of said cross-wise leg of said second T-shaped hinge portion to oscillate synchronously with said cross-wise leg of said first T-shaped hinge portion.

2. The laser scanning structure according to claim 1, wherein said reflective surface of said mirror is formed on one side of said center portion of said I-beam shaped hinge.

3. The laser scanning structure according to claim 2, wherein said first T-shaped hinge portion, said second T-shaped hinge portion, and said mirror are formed as a single silicon component.

* * * * *